(No Model.)
W. M. FISCHER.
FILTERING APPARATUS.
No. 290,019. Patented Dec. 11, 1883.
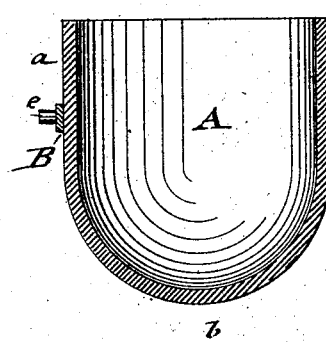
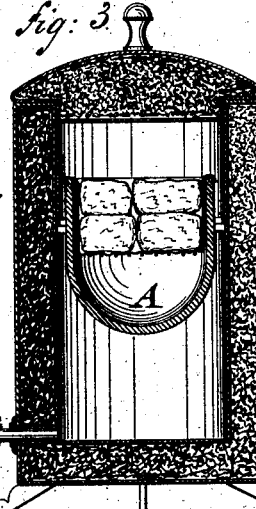
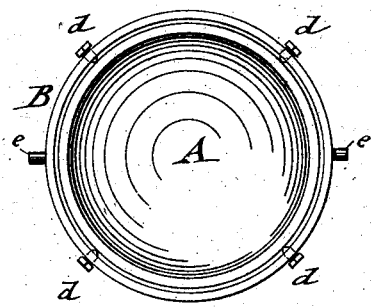
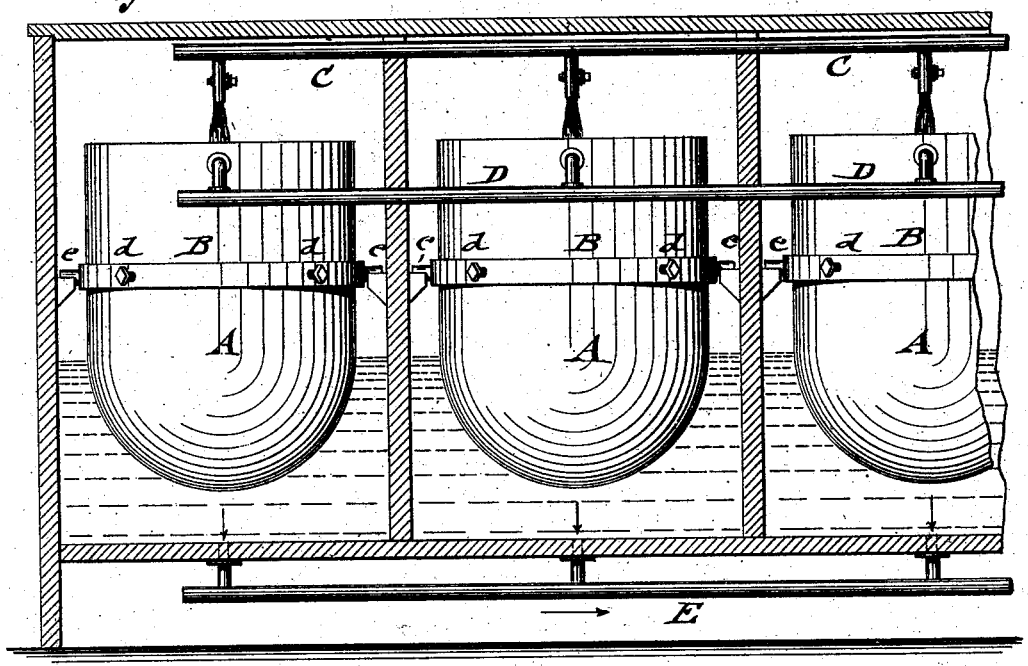
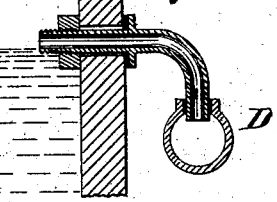
WITNESSES:
A. Schehl.
Fol. N. Rosenbaum.
INVENTOR
Wilhelm M. Fischer
BY Paul Goepel
ATTORNEY

UNITED STATES PATENT OFFICE.

WILHELM M. FISCHER, OF NEW YORK, N. Y.

FILTERING APPARATUS.

SPECIFICATION forming part of Letters Patent No. 290,019, dated December 11, 1883.

Application filed February 5, 1883. (No model.)

*To all whom it may concern:*

Be it known that I, WILHELM M. FISCHER, of the city, county, and State of New York, have invented certain new and useful Improvements in Filtering Apparatus, of which the following is a specification.

This invention has reference to an improved apparatus for filtering water for domestic and other purposes.

The filter is based upon the well-known property of most stones to admit water to percolate through the same after the entire stone has become sufficiently soaked with water, after which percolation will take place with considerable rapidity, assisted by the pressure of the column of water to be filtered.

The invention consists of a hollow stone filter, made of one piece, preferably with hemispherical bottom, and supported by an exterior hoop secured by fastening-screws in a suitable receptacle.

In the accompanying drawings, Figure 1 represents a vertical central section of my improved water-filter. Fig. 2 is a plan of the same. Fig. 3 is a vertical central section of a water-cooler with my improved water-filter. Fig. 4 shows a battery of filters used for cooling larger quantities of water; and Fig. 5 is a detail transverse section of the overflow-pipe of the filtering apparatus shown in Fig. 4.

Similar letters of reference indicate corresponding parts.

My improved stone filter A is made from a solid piece of limestone, sandstone, or any other suitable stone. The filter A may be of any suitable shape, though it is preferable to make the body cylindrical and the bottom hemispherical, as this shape can be manufactured with greater facility. The walls of the stone filter are made of uniform thickness, and thick enough to secure the required degree of permanency and durability. The filter A is supported by an iron hoop, B, applied to the upper portion of the same by means of four clamp-screws, $d$ $d$, as shown clearly in Fig. 2. The filter is supported by means of gudgeons, $e$ $e$, at diametrically opposite points of its hoop, B, on bearings of a suitable receptacle, so that the filter can be readily tilted for cleaning. When the filter is arranged at the interior of a water-cooler the ice is supported, preferably, in a wire basket in the upper part of the filter, as shown in Fig. 3.

When large quantities of water are to be filtered, a battery of stone filters are arranged as shown in Fig. 4, to which the water is regularly supplied from a supply-pipe, C, the filters A A being connected to an overflow-pipe, D, that conducts off the surplus water, while the filtered water is drawn off by a pipe, E, at the bottom of the inclosing-receptacles. When the filter has been filled with water, the stone walls of the same first absorb sufficient moisture and then give off gradually drops of water at the exterior surface of the same. The percolated drops pass along the outer bottom surface by their own weight, and are collected at the lower part of the inclosing-receptacle. The weight of the column of water in the filter accelerates the filtering process after the same has been started. Impurities are retained at the inside of the filter, while the perfectly clear and pure water is drawn off.

From time to time the interior surface is cleaned by a stiff brush, so as to keep the pores of the stone open, and secure the proper action of the filter. For this purpose the filter is removed from its inclosing-receptacle or tilted, as found most convenient.

Having thus described my invention, I claim as new and desire to secure by Letters Patent—

1. A filter made in one piece of porous stone, with hemispherical bottom, and provided with a hoop near its center, secured by set-screws, and journals or gudgeons for tilting the filter, in combination with a water-cooler provided with bearings to receive the said journals, substantially as described.

2. A battery of filters arranged in a supporting-frame, and journaled near their centers to the frame, in combination with supply-pipes and cocks, overflow-pipes, and discharge-pipes, substantially as described.

In testimony that I claim the foregoing as my invention I have signed my name in presence of two subscribing witnesses.

WILHELM M. FISCHER.

Witnesses:
PAUL GOEPEL,
SIDNEY MANN.